United States Patent

Jeong et al.

[11] Patent Number: 5,955,861
[45] Date of Patent: Sep. 21, 1999

[54] SENSORLESS SWITCHED RELUCTANCE MOTOR DRIVING APPARATUS AND METHOD THEREOF

[75] Inventors: Seong-Ki Jeong, Suwon; In-Jung Ha, Seoul; Tae-Han Kim, Pusan, all of Rep. of Korea

[73] Assignee: Samsung Electronics Co., Ltd., Rep. of Korea

[21] Appl. No.: 09/013,228

[22] Filed: Jan. 26, 1998

[30] Foreign Application Priority Data

Nov. 10, 1997 [KR] Rep. of Korea ............... P97-59039

[51] Int. Cl.$^6$ ........................................... H02P 1/46
[52] U.S. Cl. ............................... 318/701; 318/254
[58] Field of Search ....................... 318/701, 254

[56] References Cited

U.S. PATENT DOCUMENTS 5,589,751  12/1996  Lim ............................ 318/701
5,689,165  11/1997  Jones et al. ................ 318/701

*Primary Examiner*—William M. Shoop, Jr.
*Assistant Examiner*—Rita Leykin
*Attorney, Agent, or Firm*—Larson & Taylor

[57] ABSTRACT

A sensorless switched reluctance motor (SRM) driving apparatus comprising: a phase control unit for outputting a start or stop command signal for the SRM and a speed command signal to set rotation speed thereof; a phase detecting circuit for outputting a phase current signal after measuring the phase current transmitted to the SRM; a digital firing angle estimating unit for outputting a rotor phase signal to supply the current to a specific phase of the rotor if the arrangement command signal is input, and for outputting a rotor phase signal after measuring a SRM firing angle by comparing a phase current signal and a reference phase converting period signal as a pulse signal is applied to a phase previously magnetized when the SRM has been rotated; a speed control unit for sending an arrangement command signal to the digital firing angle estimating unit if an operation start signal is input from the phase control unit, for outputting a voltage command signal to control the SRM rotation speed in response to the speed command signal from the phase control unit and the phase converting period signal from the digital firing angle period estimating unit, and generating and inputting a reference phase converting period signal to the digital firing angle estimating unit; an inverter driving unit for generating a pulse width converting signal according to the digital firing angle estimating unit input from the speed control unit and for performing a logic combination of the pulse width converting signal and the rotor phase signal input from the digital firing angle estimating unit to send a SRM phase magnetizing signal; and an inverter for transmitting a voltage to the SRM in compliance with the phase magnetizing signal from the inverter driving unit, whereby the phase current signal detected by inputting a short pulse to an unused phase discriminates whether the rotor phase leads or lags, and whereby the voltage and phase converting period are estimated to accurately detect the firing angle without being influenced by the electric noise and mechanical noise.

7 Claims, 8 Drawing Sheets

SENSORLESS SWITCHED RELUCTANCE MOTOR DRIVING APPARATUS AND METHOD THEREOF

BACKGROUND OF THE INVENTION

1. Field of the Invention

The present invention relates to a sensorless switched reluctance motor driving apparatus and method thereof which detects a position of a rotor with change of electric currents at each phase without installing a separate position detecting sensor, to thereby drive the motor.

2. Description of the Prior Art

In general, the sensorless switched reluctance motor (hereinafter referred to as a motor) is usually used for compressors which cannot be attached with a position sensor because of driving conditions such as temperature, humidity, repair and maintenance cost and the like.

The motor, as shown in FIGS. 1, 2, 3 and 4, is disclosed at a Korean patent (No. 95-15171). FIGS. 1a and 1b are motor circuits in accordance with a first embodiment of the prior art. The conventional motor, as each phase thereof is magnetized at a predetermined sequential procedure, is provided with a motor driving unit 10, a high pass filter unit 20 having voltages (RCA), (RCB), (RCC) to detect currents at respective phases and high pass filters (20A–20C) which differentiate and amplify properly to measure the increase or decrease of the detected currents, a first amplifying unit (30) for amplifying the respective phase voltages (V1), (V2), (V3) output from the high pass filter unit 20 into the proper levels thereof, a first comparison unit 40 for outputting signals of over the reference voltage levels in comparing the voltages (VA), (VB), (VC) output at the first amplifying unit 30 with the predetermined reference voltage levels, a delay unit 50 for delaying respective phase voltages (V1), (V2), (V3) from the high pass filter unit 20 for a predetermined time duration, a second amplifying unit 60 for amplifying the voltages output from the delay unit 50 into proper levels thereof, a second comparison unit 70 for outputting signals of over the reference voltage levels in comparing the voltages ($VA^d$), ($VB^d$), ($VC^d$) output at the second amplifying unit 60 with the predetermined reference voltage levels and an "OR gating" unit 80 for "OR gating" the phase voltages output from the first and second comparison units 40, 70.

Operational effects of the conventional motor thus constructed are described in detail with reference to FIGS. 2, 3 and 4. If predetermined gate signals are subsequently applied from a base driving unit (not shown) to Metal Oxide Semiconductor (MOS) transistors (M1, M2), (M3, M4), (M5, M6), an electric current is to flow through the transistors (M1, M2), (M3, M4), (M5, M6) to coils (La), (Lb), (Lc). Then, the inductance change at respective phases are generated according to the changing positions of the rotor 11 as shown in FIG. 3 at (A), (B) and (C), respectively.

At this time, as the rotor 11 is rotated as shown in FIG. 2, reverse electric motive force generated at a wiring of the stator 12 to flow the phase currents, shown at (A), (B), (C) in FIG. 4, to the phase current detecting resistances (RCA), (RCB)(RCC), where voltages of small value are used to reduce loss thereof in the resistances (RCA), (RCB), (RCC).

The currents (iA), (iB), (iC) detected by the phase current detecting resistances (RCA), (RCB), (RCC) are, in sequence, differentiated by the high pass filters (20A–20C) having condensers, resistances and operation amplifiers (CA, RA, OP1), (CB, RB, OP2), (CC, RC, OP3), supplied to respective amplifiers of the first amplifying unit 30 (AMP1), (AMP2), (AMP3), amplified them into proper levels thereof to form the wave forms of (D), (E), (F) in FIG. 4, and then compared with the reference voltages pre-set at comparing means (C71), (C72), (C73) to output only higher levels of voltages than the reference voltages (Vref1, Vref2, Vref3).

The voltages (–V1), (–V2), (–V3) output from the high pass filters (20A–20C) are turned in reverse and delayed for a predetermined time duration at delaying means (RD1, C D1), (R D2, C D2) (R D3, C D3). At this time, the delay signals thereof are amplified into proper levels thereof at the amplifiers (AMP4), (AMP5), (AMP6) of the second amplifying unit 60 to be transmitted as signals of (D), (E), (F) in FIG. 4.

The voltages ($VA^d$), ($VB^d$), ($VC^d$) output from the amplifiers (AMP4), (AMP5), (AMP6) are compared with the predetermined reference voltages (Vref4, Vref5, Vref6) at comparing means (C74), (C75), (C76) to output only higher levels of voltages than the reference voltages (Vref4, Vref5, Vref6). Then, the voltages are ORed with the voltages output from the comparing means (C74), (C75), (C76) at the OR gates (OR1) (OR2), (OR3) to transmit the wave forms of (G), (H), (I) in FIG. 4, which are used for detecting the position of the rotor 11.

However, there is a problem in the conventional motor in that the position angles of the rotor are detected by characteristic features of the filter unit or the delay unit, thereby getting the position firing angles of the rotor to be changed in case of controlling variable speed thereof.

In addition, there is another problem in the conventional motor in that the high frequency of noise caused by the high pass characteristic feature of the filter unit influences on output thereof to generate a firing angle signal from the signal weak at noise, to thereby cause a possibility of stopping the motor due to the unfit firing angles thereof.

Furthermore, there is still another problem in that external mechanical noise is induced to change the current wave forms, to thereby cause a possibility of chattering phenomenon at the output thereof at the comparing means after being passed through the filter unit.

SUMMARY OF THE INVENTION

The present invention is presented to solve the aforementioned problems and it is an object of the present invention to provide a sensorless switched reluctance motor (SRM) driving apparatus and a method thereof which are strong to electric noise and external mechanical noise.

In addition, it is another object of the present invention to provide a sensorless SRM driving apparatus and a method thereof which overcome error in detecting firing angles thereof for accurate determination.

In order to achieve the object of the present invention, there is provided a sensorless reluctance motor driving apparatus, the apparatus comprising:

a main control unit for outputting a start or stop command signal for the SRM and a speed command signal to set a rotation speed thereof;

a phase detecting circuit for outputting a phase current signal after measuring the phase current transmitted to the SRM;

a digital firing angle estimating unit for outputting a rotor phase signal to supply the current to a specific phase if the arrangement command signal is input, and for outputting a rotor phase signal after measuring a SRM firing angle by comparing a phase current signal and a reference phase converting period signal as a pulse signal is applied to a phase previously magnetized when the SRM has been rotated;

a speed control unit for sending an arrangement command signal to the digital firing angle estimating unit if an operation start signal is input from the main control unit, for outputting a voltage command signal to control the SRM rotation speed in response to the speed command signal from the phase control unit and the phase converting period signal from the digital firing angle period estimating unit, and generating and sending a reference phase converting period signal to the digital firing angle estimating unit;

an inverter driving unit for generating a pulse width modulating signal according to the voltage command signal input from the speed control unit and for performing a logic combination of the pulse width converting signal and the rotor phase signal input from the digital firing angle estimating unit to send a SRM phase magnetizing signal; and an inverter for transmitting a voltage to the SRM in compliance with the phase magnetizing signal from the inverter driving unit.

In order to achieve the object of the present invention, there is also provided a method of the sensorless SRM driving apparatus, the method comprising the steps of:

inputting a speed command signal for inputting a SRM operation command signal and a speed command signal to select a SRM speed;

arranging a rotor by applying current to a specific stator phase if the operation command signal is input;

operating the SRM as pulse signals are continuously output to an unused phase until the SRM speed reaches the preset SRM speed to estimate a firing angle thereof and to carry out the phase conversion at the estimated firing angle;

accelerating the SRM as the rotor phase is detected until the SRM gets to a preset rotation speed to thereby adjust voltage command and to sequentially reduce the phase converting period; and maintaining the SRM at a selected speed thereof by adjusting the voltage command and the phase converting period as a result of the determination of the rotor phase until the stop command of the SRM is input.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
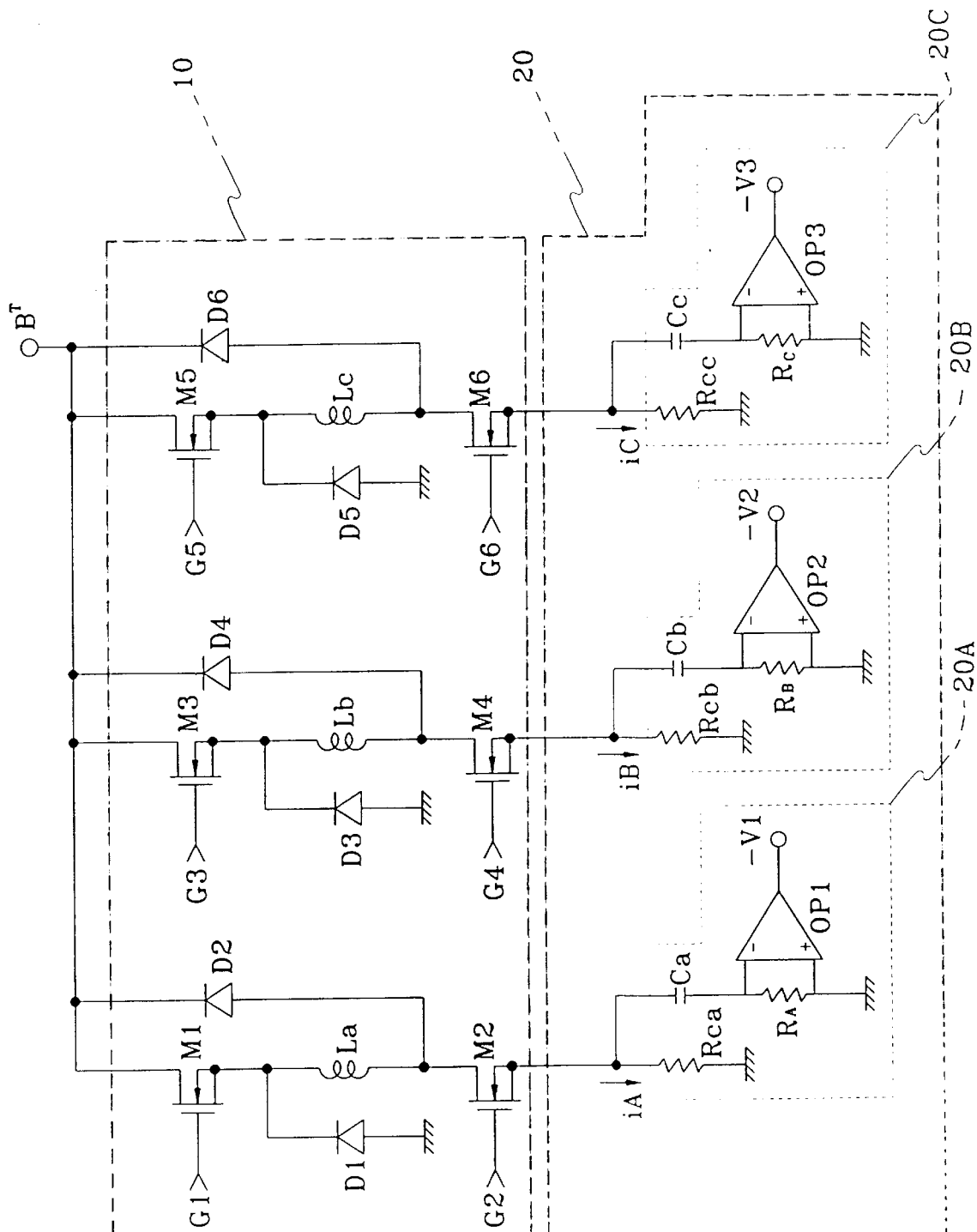
FIGS. 1a and 1b are circuits of a sensorless SRM in accordance with an embodiment of the prior art.
Figure 1:
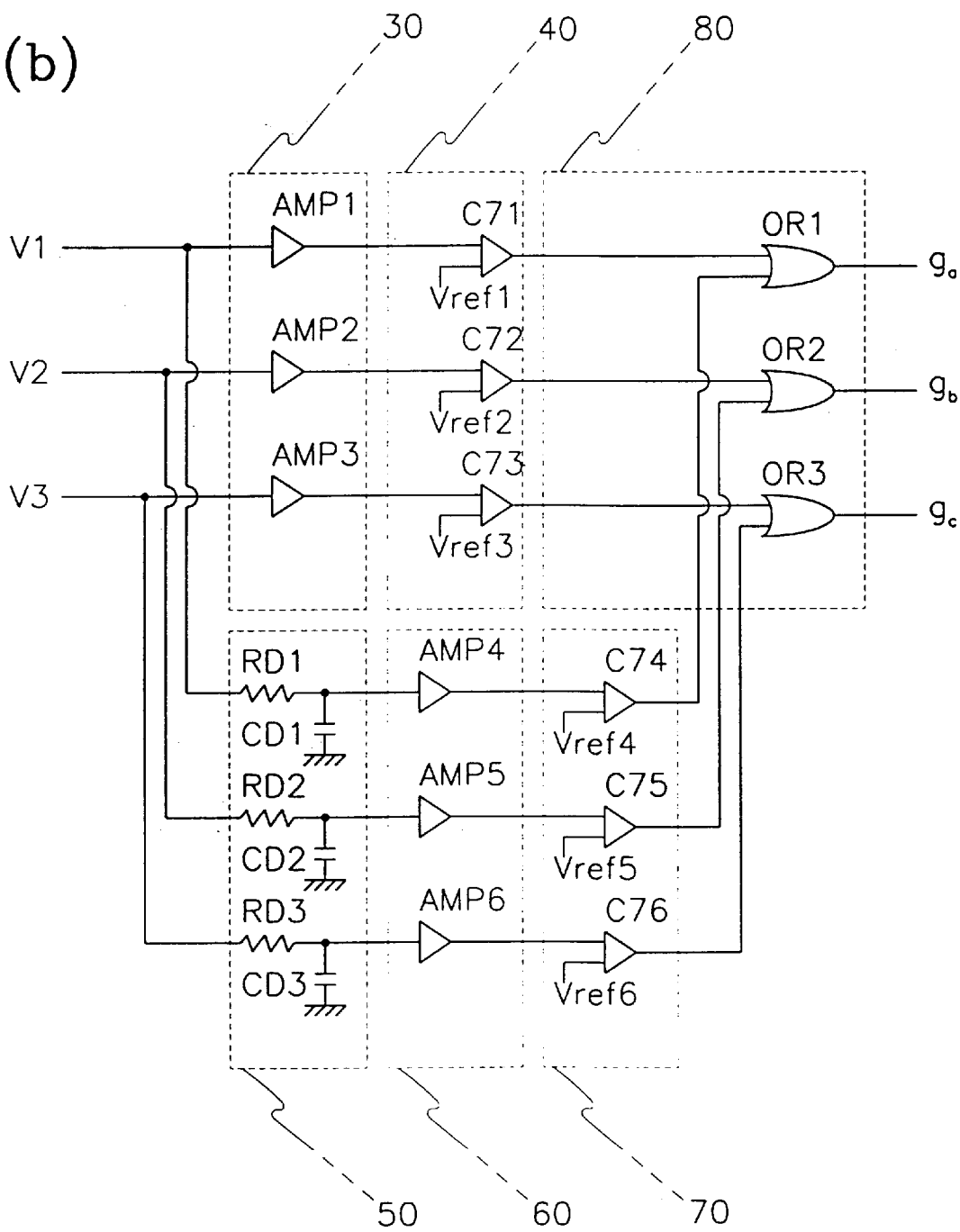
Figure 2:
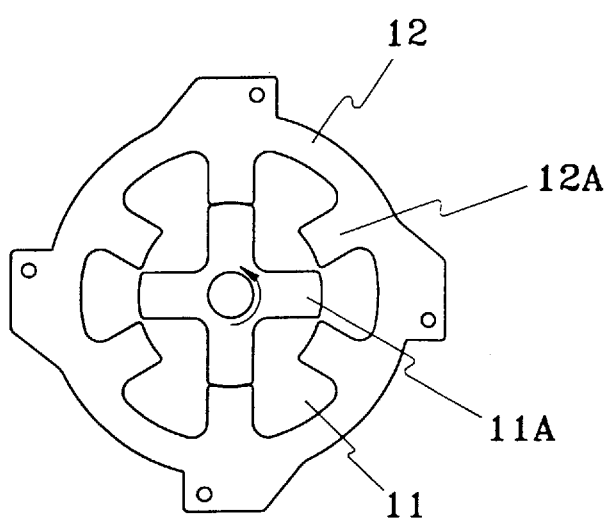
FIG. 2 is a brief view of a general SRM.
Figure 3:
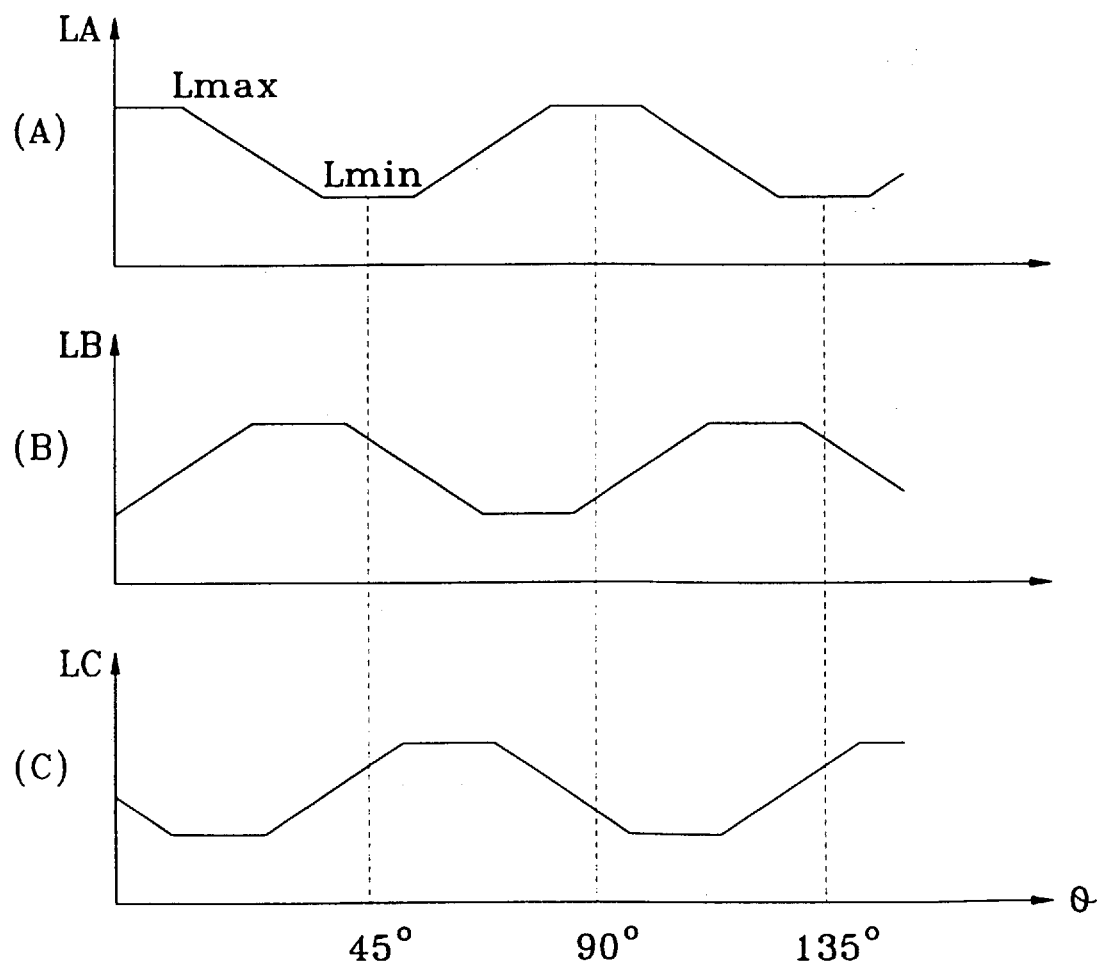
FIGS. 3A, 3B and 3C are views for illustrating an inductance conversion at each phase of a conventional SRM.
Figure 4:
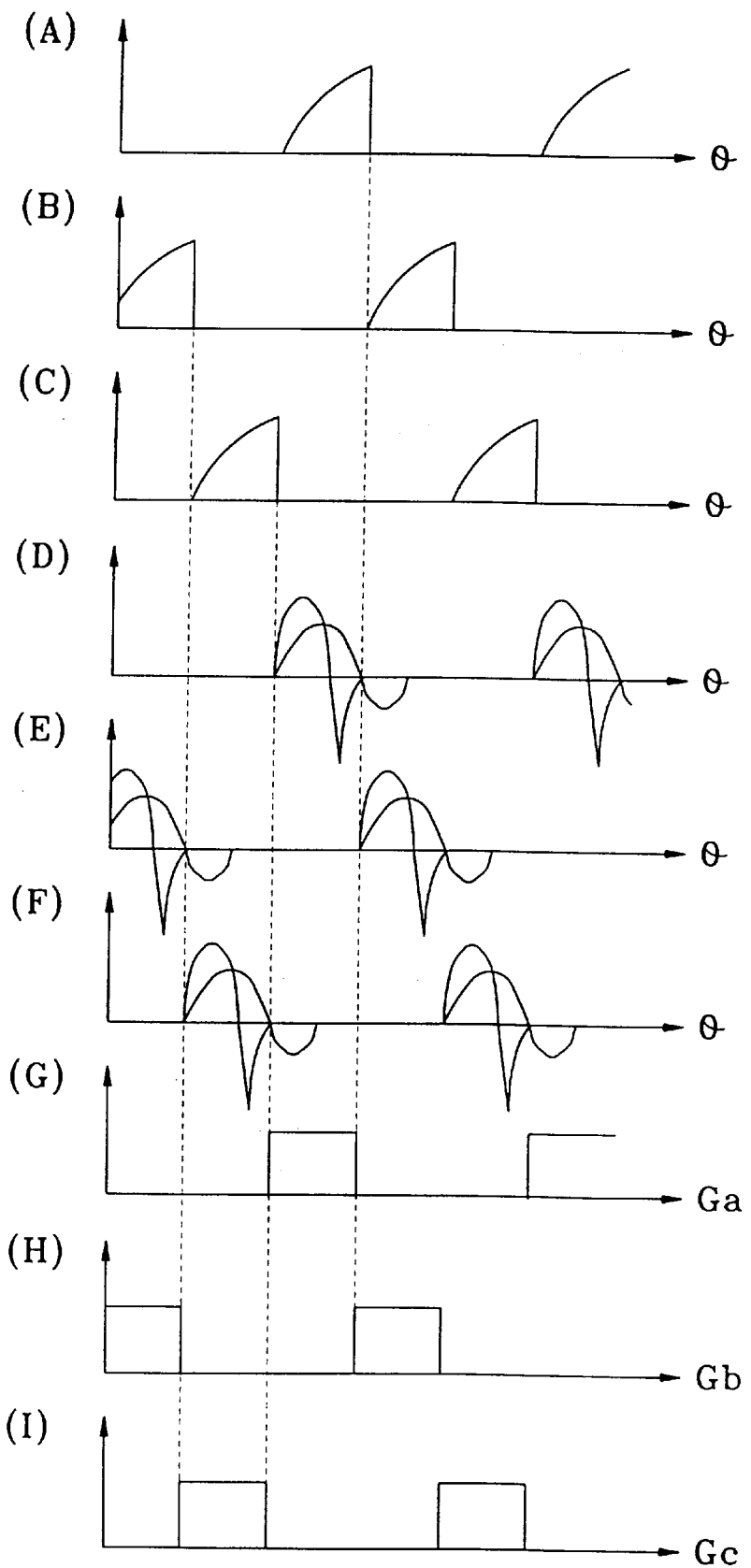
FIG. 4 shows waveforms at each part of a sensorless SRM in accordance with an embodiment of the prior art in FIGS. 1a and 1b.
Figure 5:
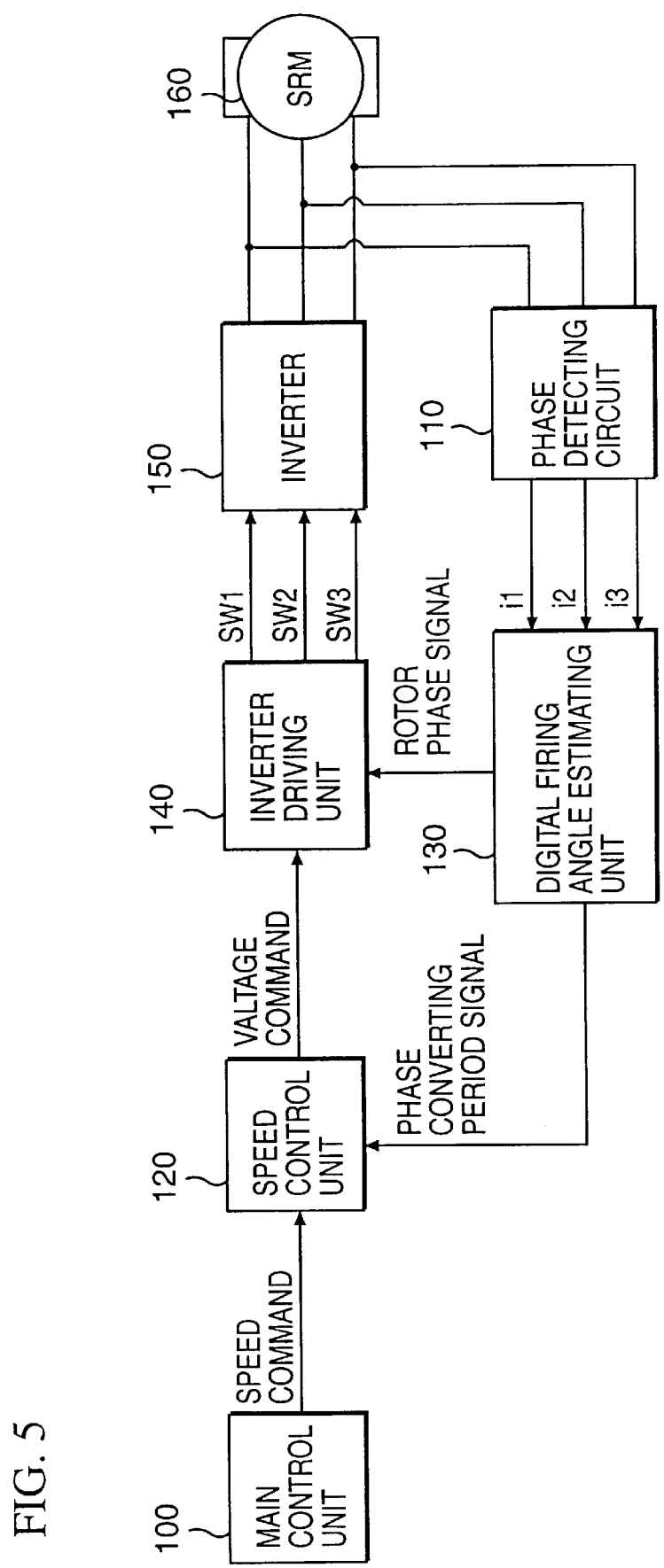
FIG. 5 is a brief block diagram of a sensorless SRM driving apparatus in accordance with the present invention.
Figure 6:
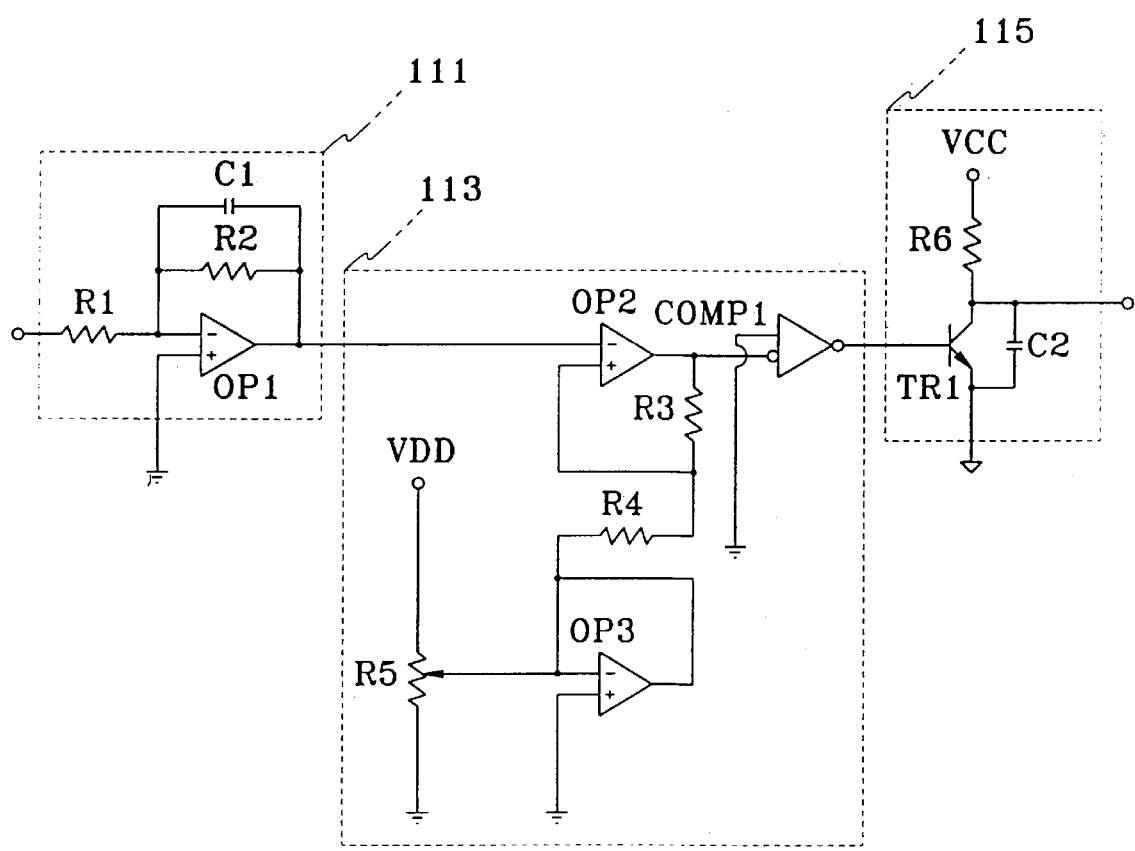
FIG. 6 is a detailed circuit of a phase detecting circuit in FIG. 5.

A preferred embodiment of the present invention is described in detail with reference to the accompanying drawings. FIG. 5 is a brief block diagram of a sensorless SRM driving apparatus in accordance with the present invention, and FIG. 6 is a detailed circuit of a phase estimating circuit in FIG. 5. The SRM driving apparatus in accordance with the present invention includes a main control unit 100, a phase detecting circuit 110, a speed control unit 120, a digital firing angle estimating unit 130, an inverter driving unit 140 and an inverter 150.

The main control unit 100 generates an operation start or stop command signal for the SRM and a speed command signal for selecting a revolution speed of the SRM 160 to transmit to the speed control unit 120.

The phase detecting circuit 110 includes a filter unit 111, a schmitt trigger unit 113 and an output unit 115 to measure respective current supplied to the SRM 160 and to send the respective current signals (i1, i2, i3) to the digital firing angle estimating unit 120.

The filter unit 111 has an operational amplifier (OP1), resistance (R1, R2) and a capacitor (C1) to remove a high frequency noise detected by the phase current detecting resistance (not shown).

The schmitt trigger unit 113 includes operational amplifiers (OP2, OP3), resistances (R3, R4, R5) and comparing means (COMP1) to remove the noise that remains at respective phase current signals output from the filter unit 111.

The output unit 115 includes a transistor (TR1), a resistance (R6) and a capacitor (C2) to transmit the phase current signals from the schmitt trigger unit 113 to the digital firing angle estimating unit 130.

If an operation command signal is input from the main control unit 100, the speed control unit 120 transmits an arrangement command signal to the digital firing angle estimating unit 130 and a voltage command signal for controlling the SRM speed in response to the speed command signal from the main control unit 110 and the phase converting period signal from the digital firing angle estimating unit 130 to the inverter driving unit 140.

The speed control unit 120 generates a reference phase converting period signal for converting phases, to thereby input to the digital firing angle estimating unit 130. At this time, the speed control unit 120 utilizes a digital counter to generate the reference phase converting period signal.

If the digital firing angle estimating unit 130 receives the arrangement command signal from the speed control unit 120, the rotor phase signal in a form of pulse signal for supplying current to a specific phase is transmitted to the inverter driving unit 140, thereby arranging the rotor. The pulse signals are continuously sent to the previously magnetized phases until the SRM 160 revolution speed reaches the preset value thereof. Then, it is discriminated with the magnetized phase current signal input from the main detecting circuit 110 whether the rotor gets to the phase converting position. If the rotor reaches phase converting period, the rotor phase signal to convert the phases is input to the inverter driving unit 140.

In addition, if the SRM 160 reaches the preset revolution speed, the digital firing angle detecting unit 130 sends one short pulse to the previously magnetized phase. The phase current signal previously magnetized from the phase detecting circuit 110 is compared with the reference phase converting period signal from the speed control unit 120 to estimate the firing angle of the SRM 160, whereby the estimated rotor phase signal is output to the inverter driving unit 140 and the respective phase current signal is input from the phase detecting circuit 110 to send the phase converting period signal to the speed control unit 120.

The inverter driving unit 140 generates a pulse width modulation signal in response to the voltage command signal input from the speed control unit 120. The logic combination is performed by using the pulse width modulation signal and the rotor phase signal from the digital firing angle estimating unit 130 to transmit the respective phase magnetizing signals (sw1, sw2, sw3) of the SRM160 to the inverter 150.

The inverter 150 supplies voltages to the SRM160 in compliance with the respective magnetizing signals (sw1, sw2, sw3) output from the inverter driving unit 140.

Figure 7A:
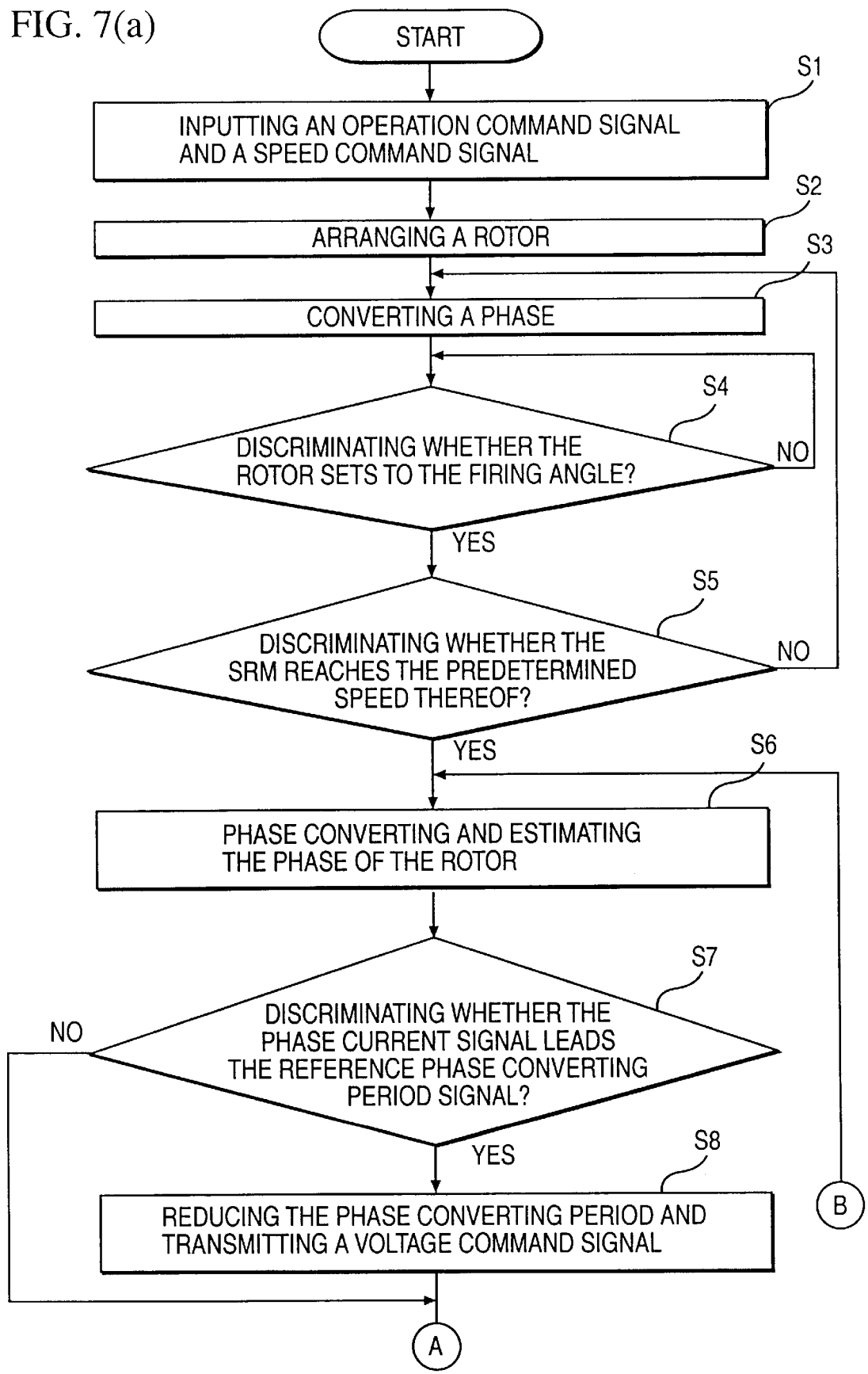
FIG. 7 shows an operational sequence of a sensorless SRM driving apparatus in accordance with the present invention.
Figure 7B:
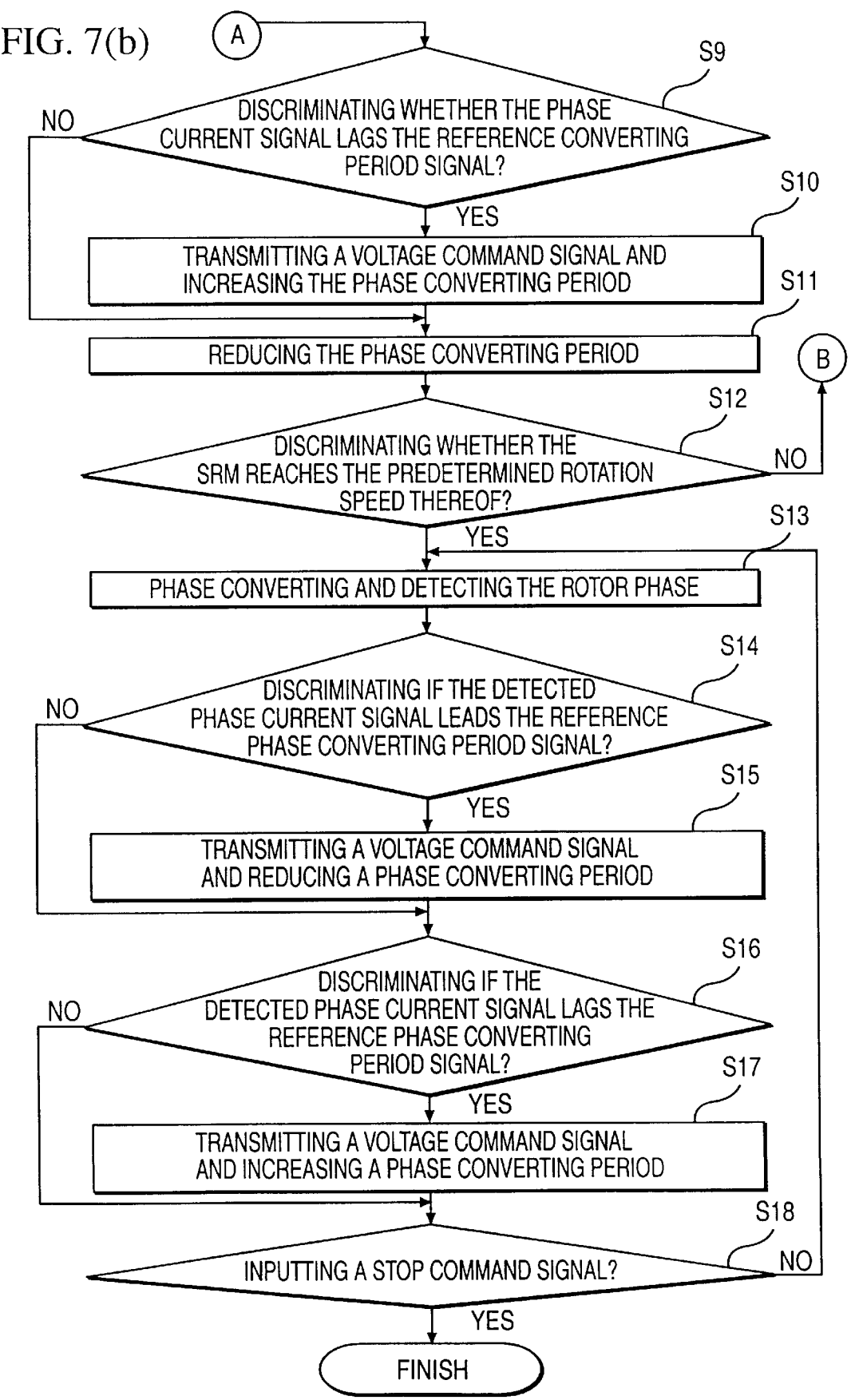

Operational procedures and operational effects are described in detail with reference to FIG. 7.

If the operation command signal and the speed command signal are input from the main control unit 100, the speed control unit 120 transmits an arrangement command signal for arranging the rotor to the digital firing angle estimating unit 130, which arranges the rotor of the SRM 160 according to the arrangement command signal.

In other words, if the arrangement command signal is input from the speed control unit 120, the digital firing angle estimating unit 130 outputs a rotor phase signal of supplying current to a specific phase of the SRM 160 through the inverter driving unit 140, which performs a logic combination of the pulse width modulation signal generated in itself according to the rotor signal from the digital firing angle estimating unit 130 and the voltage command signal from the speed control unit 120 and outputs a phase magnetizing signal to the inverter 150. Then, the inverter 150 supplies current to a specific rotor phase of the SRM 160 in compliance with the phase magnetizing signal input from the inverter driving unit 140 to arrange the rotor. (S1, S2)

If a predetermined time duration lapses after the rotor has been arranged, the digital firing angle estimating unit 130 continuously sends pulse signals to the previously magnetized phase. It is discriminated whether the rotor reaches a firing angle thereof from the phase current signal of the previously magnetized phase input from the phase detecting circuit 110. If the rotor gets to the firing angle, the rotor phase signal for carrying out the converting phase is sent to the inverter driving unit 140. Then, the aforementioned procedures are repeated until the SRM speed gets to the predetermined speed thereof. (S3, S4, S5).

At this time, the digital phase current signal output from the phase detecting circuit 110 obtains the information on which positions the rotor has passed by way of the characteristic feature of the current shown in a math formula 1:

$$\frac{\Delta I}{\Delta t} \cong \frac{1}{L(\theta)}\left(V - Ri - \frac{dL}{d\theta}\theta' i\right)$$

where, t is time, I is current value, V is a normal voltage, R is resistance, and L is inductance.

Therefore, as the phase current change rate is different depending on the phase of the rotor, the position of the rotor is estimated by the phase current signal. The digital firing angle detecting unit 130 continuously sends the pulse signals to the inverter driving unit 140 to discriminate whether the rotor reaches the firing angle thereof. If so, the operational procedures of inputting the rotor phase signal to the inverter driving unit 140 are repeated for converting the phase, whereby the SRM speed reaches the predetermined speed.

If the SRM speed is over the predetermined revolution speed thereof, the digital firing angle estimating unit 130 transmits a phase signal of phase conversion to the inverter driving unit 140, to thereby carry out the phase conversion and estimate the phase of the rotor.

Then, the digital firing angle estimating unit 130 outputs a short pulse signal to the previously magnetized phase, and the phase detecting circuit 110 detects the previously magnetized phase current. The digital firing angle estimating unit 130 is compared with the reference phase converting signal input from the speed control unit 120 to thereby estimate the phase of the rotor. (S6)

At this time, if the phase current signal from the phase detecting circuit 110 leads the reference phase converting period signal from the speed control unit 120, the digital firing angle estimating unit 130 reduces the phase converting period to transmit the rotor phase signal to the inverter driving unit 140 and the lead signal to the speed control unit 120, which outputs the voltage command signal to the inverter driving unit 140. (S7, S8)

If the detected phase current signal lags the reference phase converting period signal, the speed control unit 120 receives a lag signal from the digital firing angle detecting unit 130 to output the voltage command to the inverter driving unit 140. The digital firing angle estimating unit 130 increases the phase converting period to transmit the rotor phase signal to the inverter driving unit 140. (S9, S10)

Then, after the phase converting period is reduced by a predetermined amount for acceleration, the operational procedures subsequent to S6 are repeated until the SRM 160 reaches a revolution speed thereof preset by the main control unit 100. As a result, the SRM 160 is accelerated and operated. (S11, S12)

If the SRM 160 is rotated at over the preset revolution speed thereof, the digital firing angle detecting unit 130 inputs the rotor phase signal to the inverter driving unit 140 for phase conversion, thereby carrying out the phase conversion and detecting the rotor phase. (S13)

Then, the digital firing angle detecting unit 130 outputs a short pulse signal to the previously magnetized phase, and the phase detecting circuit 110 detects the previously magnetized phase current to input to the digital firing angle detecting unit 130, which compares the reference phase converting signal from the speed control unit 120 and the phase current signal from the phase detecting circuit 110 to thereby estimate the phase of the rotor.

At this time, if the detected phase current signal leads the reference phase converting period signal, the speed control unit 120 reduces and inputs the voltage command to the inverter driving unit 140. The digital firing angle detecting unit 130 reduces and inputs the phase converting period to the inverter driving unit 140. (S14, S15)

If the detected phase current signal lags the reference phase converting period signal, the speed control unit 120 increases and outputs the voltage command to the inverter driving unit 140. The digital firing angle detecting unit 130 increases phase converting period to input the rotor phase signal to the inverter 140. (S16, S17)

Accordingly, the operational procedures subsequent to S13 are repeated with the SRM being rotated at the predetermined speed until a stop command signal is input from the main control unit 100. (S18)

As described above, there is an advantage in the sensorless SRM driving apparatus of the present invention in that the phase current signal detected by inputting a short pulse to an unused phase to discriminate whether the rotor phase leads or lags, whereby the voltage and phase converting period are estimated to accurately detect the firing angle of the SRM without being influenced by the electric noise and mechanical noise.

What is claim is:

1. A sensorless SRM driving apparatus comprising:
   a main control unit for outputting a start or a stop command signal for the SRM and a speed command signal for setting a rotation speed thereof;
   a phase detecting circuit for outputting a phase current signal after measuring a phase current transmitted to the SRM;
   a digital firing angle estimating unit for outputting a rotor phase signal in a form of pulse signals to supply a current to a specific phase if an arrangement command signal is input, and for continuously outputting said pulse signals to a previously magnetized phase until a rotation speed of the SRM reaches a preset speed to discriminate a phase converting position with a previously magnetized phase current signal input from the phase detecting circuit and to output a rotor phase signal to carry out a phase conversion if a rotor gets to the phase converting position, and for outputting a short pulse signal to the previously magnetized phase, if the SRM is rotated at over the preset speed, to compare the previously magnetized phase current signal input from the phase detecting circuit with a reference phase converting period signal to detect a firing angle of the SRM and to output a rotor phase signal;
   a speed control unit for sending the arrangement command signal to the digital firing angle estimating unit if the start command signal is input from the main control unit, and for outputting a voltage command signal to control a SRM rotation speed in response to the speed command signal output from the main control unit and a phase converting period signal output from the digital firing angle period estimating unit, and for generating the reference phase converting period signal in response to the speed command signal and for inputting the reference phase converting period signal to the digital firing angle estimating unit;
   an inverter driving unit for generating a pulse width modulation signal according to the voltage command signal input from the speed control unit and for combining the pulse width modulation signal and the rotor phase signal input from the digital firing angle estimating unit to produce an SRM phase magnetizing signal; and
   an inverter for transmitting a voltage to the SRM in compliance with the SRM phase magnetizing signal produced by the inverter driving unit.

2. The apparatus, as defined in claim 1, wherein the speed control unit utilizes a digital counter to generate a reference phase converting period signal.

3. The apparatus, as defined in claim 1, wherein the phase detecting circuit comprises:
   a filter unit for removing a high frequency noise detected by the phase current detecting resistance;
   a schmitt trigger unit for removing the noise remaining at the phase current signal output from the filter unit;
   an output unit for transmitting the phase current signal from the schmitt trigger unit to the digital firing angle estimating unit.

4. A method of a sensorless SRM driving apparatus, the method comprising the steps of:
   inputting a speed command signal for inputting a SRM operation command signal and a speed command signal to set a SRM rotation speed;
   arranging a rotor by applying current to a specific stator phase if the operation command signal is input;
   operating the SRM as pulse signals are continuously output to an unused phase until the SRM speed reaches the preset SRM speed to estimate a firing angle thereof and to carry out the phase conversion at the estimated firing angle;
   accelerating the SRM as the rotor phase is detected until the SRM gets to a preset rotation speed to thereby adjust a voltage command and to sequentially reduce the phase converting period; and
   maintaining the SRM being rotated at a selected speed thereof by adjusting the voltage command and the phase converting period as a result of the determination of the rotor phase until the stop command of the SRM is input.

5. The apparatus, as defined in claim 4, wherein the method comprises the step of operating the SRM having the steps of:
   converting phases for driving the SRM;
   discriminating whether the SRM reaches a firing angle thereof in response to the phase current signal output from the phase detecting circuit as the pulse signals have continuously been transmitted to the previously magnetized phase; and
   repeating the phase conversion until the rotor reaches the preset revolution speed.

6. The apparatus, as defined in claim 4, wherein the method comprises the step of accelerating the SRM having the steps of:
   estimating the phase with the phase current signal output from the phase detecting circuit as the phase is converted, if the rotor is at over the preset rotation speed thereof, and as the pulse signal is transmitted to the previously magnetized phase;
   reducing the voltage command signal from the speed control unit and the following phase converting period if the phase current signal leads the reference phase converting period signal, and increasing the voltage command signal and the following phase converting period if the phase current signal lags the reference phase converting period signal;
   decreasing a phase converting period to the predetermined period for accelerating the SRM; and
   repeating the step of estimating the phase until the SRM is rotated at a preset revolution speed thereof.

7. The apparatus, as defined in claim 4, wherein the method comprises the step of maintaining the SRM having the steps of:
   detecting the phase with the phase current signal output from the phase detecting circuit, if the rotor speed is at over the preset speed, as the phase is converted and as the pulse signal is sent to the previously magnetized phase;
   reducing the voltage command signal from the speed control unit and the following phase converting period if the phase current signal leads the reference phase converting period signal and increasing the voltage command signal and the following phase converting period if the phase current signal lags the reference phase converting period signal; and
   repeating the step of estimating the phase until a SRM operation stop signal is input.

* * * * *